United States Patent
Kataoka et al.

(10) Patent No.: US 6,956,596 B2
(45) Date of Patent: Oct. 18, 2005

(54) METHOD FOR CORRECTING THE BEAM INTENSITY IN AN IMAGE RECORDING APPARATUS USING A MULTI-CHANNEL LIGHT MODULATOR

(75) Inventors: Yoshikazu Kataoka, Kyoto (JP); Eiichi Tamaki, Kyoto (JP); Takahide Hirawa, Kyoto (JP)

(73) Assignee: Dainippon Screen Mfg. Co., Ltd, Kyoto (JP)

( * ) Notice: Subject to any disclaimer, the term of this patent is extended or adjusted under 35 U.S.C. 154(b) by 14 days.

(21) Appl. No.: 10/283,377

(22) Filed: Oct. 30, 2002

(65) Prior Publication Data

US 2003/0085985 A1 May 8, 2003

(30) Foreign Application Priority Data

Nov. 8, 2001 (JP) .................................... P2001-342768

(51) Int. Cl.⁷ ................................................. B41J 2/47
(52) U.S. Cl. ....................................... 347/239; 247/255
(58) Field of Search ............................... 347/135–136, 347/142–144, 239, 253, 255, 236, 241, 246, 256, 237, 247; 359/323; 702/85; 250/237 G, 252.1

(56) References Cited

U.S. PATENT DOCUMENTS

| 4,581,617 A | 4/1986 | Yoshimoto et al. ......... 347/239 |
| 4,780,731 A | 10/1988 | Creutzmann et al. ....... 347/237 |
| 5,081,597 A * | 1/1992 | Kowalski ..................... 702/85 |
| 5,323,002 A * | 6/1994 | Sampsell et al. ......... 250/252.1 |
| 6,011,631 A * | 1/2000 | Broddin et al. ............. 347/239 |
| 6,188,427 B1 * | 2/2001 | Anderson et al. ........... 347/255 |
| 6,201,559 B1 | 3/2001 | Wada et al. ................. 347/236 |
| 6,337,706 B1 * | 1/2002 | Fujita .......................... 347/236 |
| 6,369,936 B1 * | 4/2002 | Moulin ....................... 369/323 |
| 6,479,811 B1 * | 11/2002 | Kruschwitz et al. ..... 250/237 G |
| 2002/0180944 A1 * | 12/2002 | Fujii et al. ..................... 355/70 |
| 2003/0189635 A1 * | 10/2003 | Corneau et al. ............ 347/255 |

FOREIGN PATENT DOCUMENTS

| EP | 0 829 933 A2 | 3/1998 |
| JP | H01-186352 | 7/1989 |
| JP | P2000-231157 A | 8/2000 |
| JP | P2001-255664 A | 9/2001 |

* cited by examiner

Primary Examiner—Hai Pham
(74) Attorney, Agent, or Firm—McDermott Will & Emery LLP

(57) ABSTRACT

In an image recording apparatus 1 which records an image on a recording medium 9 by moving an optical head 10 while rotating the recording medium 9 held by a holding drum 7, a photodetector 2 having a plurality of photodetector elements 21 is provided in a range of movement of the optical head 10. In correcting beam intensity, the optical head 10 is positioned so precisely that the photodetector 2 can receive the signal light beams. This constitution makes it possible to detect signal light beams from the light modulator with high S/N ratio as compared with a conventional case where one photodetector element sequentially receives the signal light beams, and therefore possible to correct the beam intensities with high accuracy.

15 Claims, 9 Drawing Sheets

METHOD FOR CORRECTING THE BEAM INTENSITY IN AN IMAGE RECORDING APPARATUS USING A MULTI-CHANNEL LIGHT MODULATOR

BACKGROUND OF THE INVENTION

1. Field of the Invention

The present invention relates to an image recording apparatus which uses a multi-channel light modulator, more specifically calibration of the beam intensity.

2. Description of the Background Art

Use of a multi-channel light modulator well known in the art of image recording. Such a light modulator is illuminated by light from a light source and creates multiple writing beams. To ensure high image quality, each writing beam is required to have a same target intensity. A conventional method for this purpose is to calibrate all writing beams in accordance with signals from a single-element photodetector.

If a multi-channel light modulator has a low extinction rate(contrast), however, a signal from a single-element photodetector can be lost in the noise generated by light from unselected modulator elements. Provided a modulator has 500 elements with a contrast of 100:1, total beam intensity of the unselected 499 elements is about five times the intensity of a selected element. The purpose of this invention is to overcome this difficulty.

SUMMARY OF THE INVENTION

The present invention is intended for an image recording apparatus for recording an image on a recording medium, and an object of the present invention is to provide a precise beam intensity calibration method for a multi-channel recording apparatus.

According to an aspect of the present invention, the image recording apparatus comprises a light source; a light modulator for modulating light from the light source; a holding means for holding the r10g a plurality of photodetector elements; a detecting optical system for bringing the beams from the light modulator which are subject to intensity calibration; and a correction electronics for providing correction data to the light modulator.

The calibration method of the present invention can correct the beam intensity more precisely compared with a conventional method.

According to a preferred embodiment of the present invention, the image recording apparatus further contains a different optical path for detection from that for recording.

According to another preferred embodiment of the present invention, the detection optics includes a beam splitter disposed after the light modulator. Preferably, the photodetector elements outnumber the light modulator elements.

The present invention is also intended for a method for beam intensity calibration in a multi-channel recording apparatus. According to the present invention, the method comprises a step of selecting some of the light modulator elements which are spatially separate from one another; a step of creating correction data based on the measurement data on the selected elements.

In accordance with the present invention, the beam intensity of a multi-channel light modulator is corrected rapidly and precisely.

These and other objects, features, aspects and advantages of the present invention will become more apparent from the following detailed description of the present invention when taken in conjunction with the accompanying drawings.

DESCRIPTION OF THE PREFERRED EMBODIMENTS

<1. Constitution of Apparatus>

Figure 1:
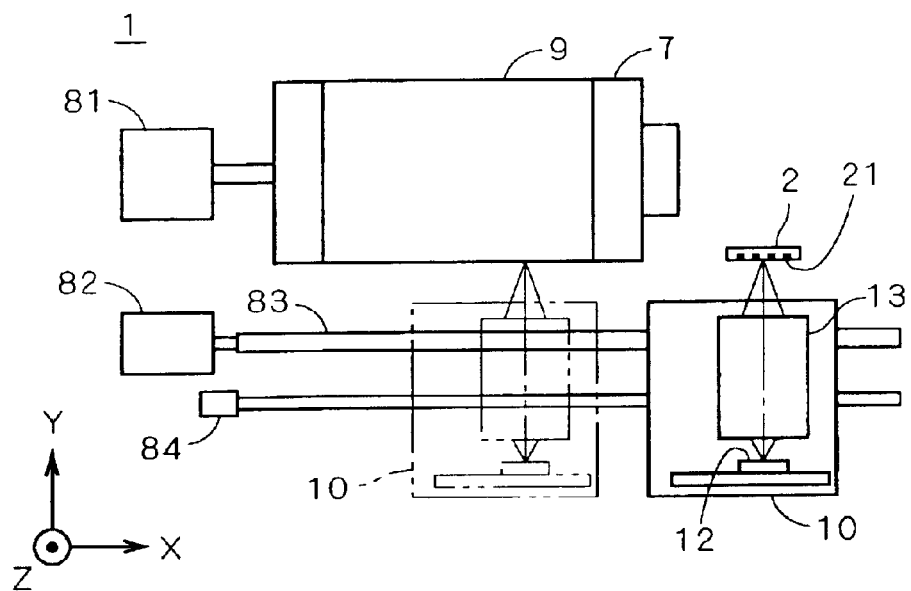
FIG. 1 is a view showing a constitution of an image recording apparatus in accordance with a preferred embodiment of the present invention.

FIG. 1 is a view showing a constitution of an image recording apparatus 1 in accordance with a preferred embodiment of the present invention. In this figure, a light source is not shown. The image recording apparatus 1 has an optical head 10 for delivering writing beams and a holding drum 7 for holding a recording medium 9 on which an image is recorded by the writing beams. As the recording medium 9, for example, used are a printing plate, a film for forming the printing plate and the like. A photosensitive drum for plateless printing may be used as the holding drum 7 and in this case, it is understood that the recording medium 9 corresponds to a surface of the photosensitive drum.

The image recording apparatus 1 further has a photodetector 2 for correcting the writing beam intensity. In FIG. 1, the optical head 10 at a position for image recording is represented by a phantom line (two-dot chain line) and that at a position for correcting the beam intensity.

The holding drum 7 is driven by a motor 81 and rotates about a central axis of its cylindrical surface holding the recording medium 9 and the optical head 10 can be moved by a motor 82 and a ball screw 83 in parallel to a rotation axis of the holding drum 7 (in the X direction of FIG. 1). The position of the optical head 10 is monitored by an encoder 84.

The optical head 10 has a light modulator 12 having a plurality of light modulator elements aligned in the X direction and a recording optics 13 which brings the signal lights from the light modulator 12 to the recording medium 9. The recording optics 13 also leads the beams from the light modulator 12 to the photodetector 2.

Figure 2:
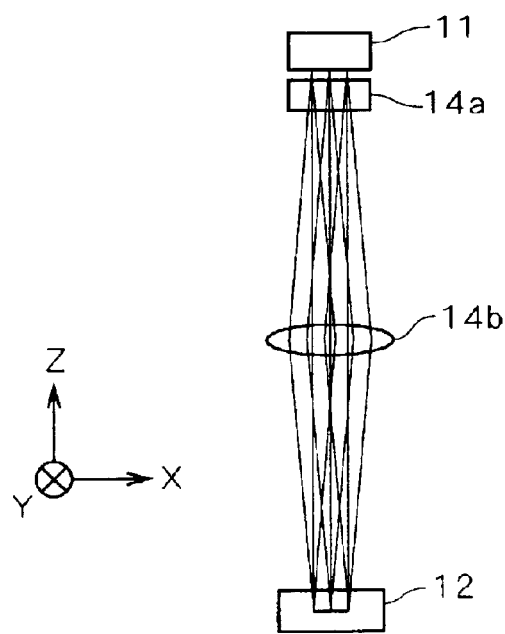
FIGS. 2 and 3 are views showing a constitution of the inside of an optical head.
Figure 3:
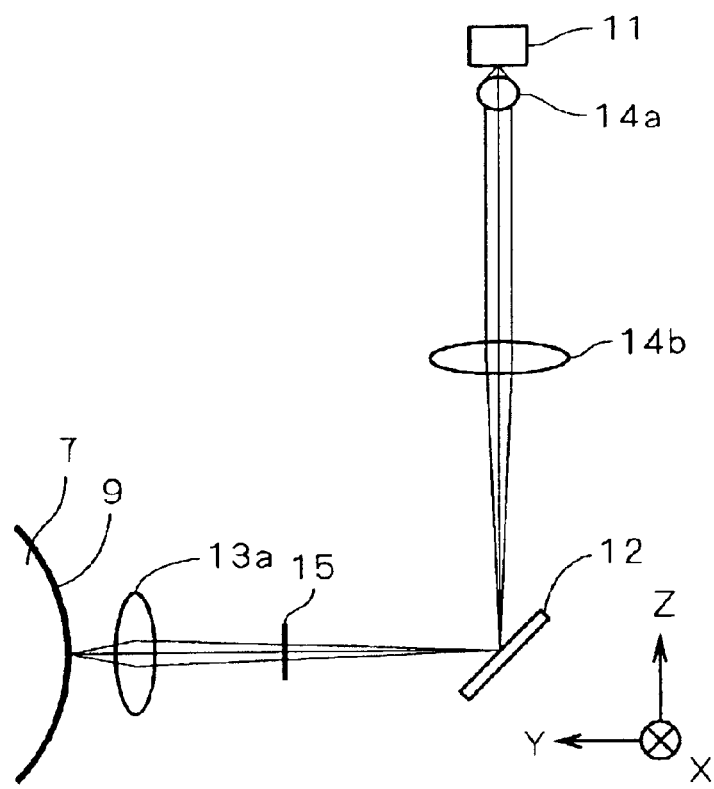

FIGS. 2 and 3 are views showing an example of the disposition of a light source 11, the light modulator 12 and optics in the optical head 10. The X, Y and Z directions in FIGS. 2 and 3 correspond to those in FIG. 1.

The light source 11 is a semiconductor laser bar, having a plurality of light emitters which are aligned in the X direction. Light beams from the light source 11 are collimated in the Y direction by a cylindrical lens 14a and overlapped in the X direction and focused in the Y direction on the light modulator 12 by a lens 14b.

The light modulator 12 used in this embodiment is the Grating Light Valve(trademarked by Silicon Light Machines, Sunnyvale, Calif.) which has a plurality of modulator elements aligned in the X direction.

Figure 4:
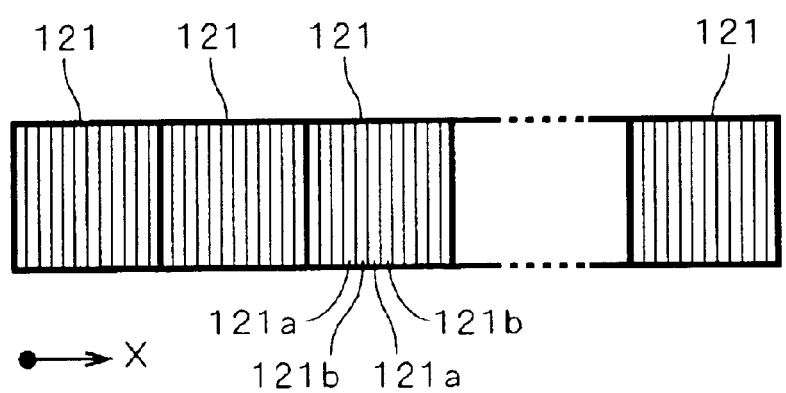
FIG. 4 is an enlarged view of light modulator elements.

FIG. 4 is an enlarged view of the aligned light modulator elements 121. The light modulator elements 121 are manufactured by using a semiconductor manufacturing technique, and each of the light modulator elements 121 consists of a plurality of ribbon-like diffraction grating members 121a and 121b. The diffraction grating members 121a go down in response to an electric potential applied between them and the substrate, while the diffraction grating members 121b are virtually stationary.

When a potential is applied, a modulator element 121 produces a square-well diffraction grating which generates diffracted light beams(non-zeroth order diffracted light beams). In this embodiment, a normally reflected light beam(zeroth order diffracted light beam) is used as a signal beam; and diffracted light beams as non-signal beams.

The signal beam is brought to the holding drum 7 through a lens 13a as shown in FIG. 3, and applied to the recording medium 9. On the other hand, the non-signal beams are blocked by a pair of light shielding plates 15. The light shielding plates 15 are so disposed at the front side and the rear side of the paper with an optical axis interposed therebetween as to receive non-zeroth order diffracted beams, and the signal beam passes through the pair of light shielding plates 15.

The optics 13 forms an image of the light modulator 12 with a variable magnification on the recording medium 9 (during recording) and the photodetector 2 (during intensity calibration), which has a plurality of photodetector elements 21.

The photodetector 2 should have at least as many elements as (preferably three times or more elements than) the light modulator 12.

Figure 5:
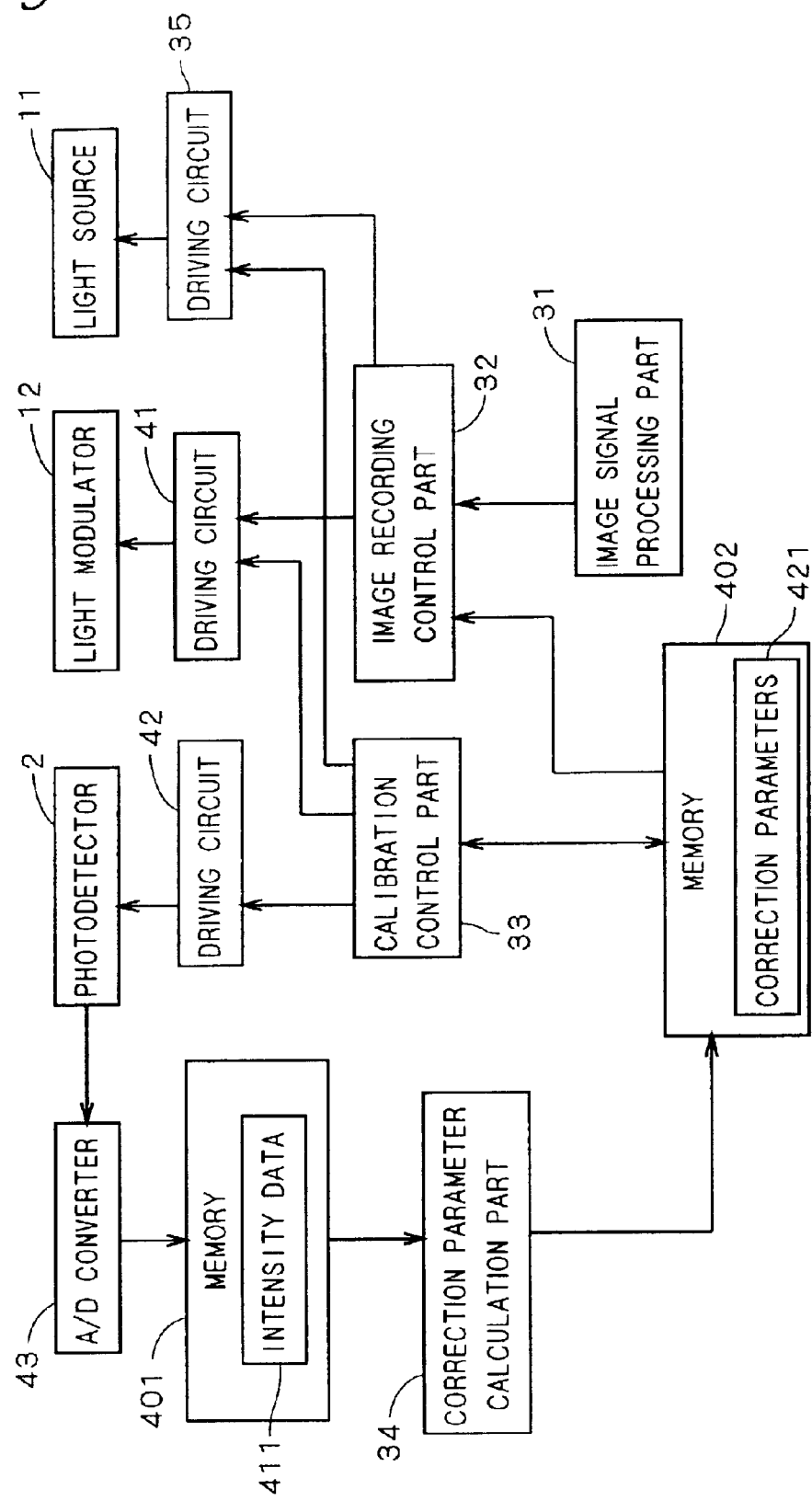
FIG. 5 is a block diagram showing prime components and peripheral components relevant to control of the image recording apparatus.

FIG. 5 is a system block diagram of the recording apparatus 1. An image signal processing means 31 processes image data to be recorded on the recording medium 9. An image recording control means 32 controls the light source 11 and the light modulator 12 according to the image data. Calibration control means 33 controls the image recording apparatus 1 during beam intensity calibration. An A/D converter 43 converts an analog signal from the photodetector 2 to a digital signal, which is recorded in a memory 401 as intensity data 411.

A correction parameter calculation means 34 generates correction parameters 421 and stores the parameters in a memory 402. The correction parameters 421 are used when the light modulator 12 is operated to record an image.

<2. Calibration Procedure>

Figure 6:
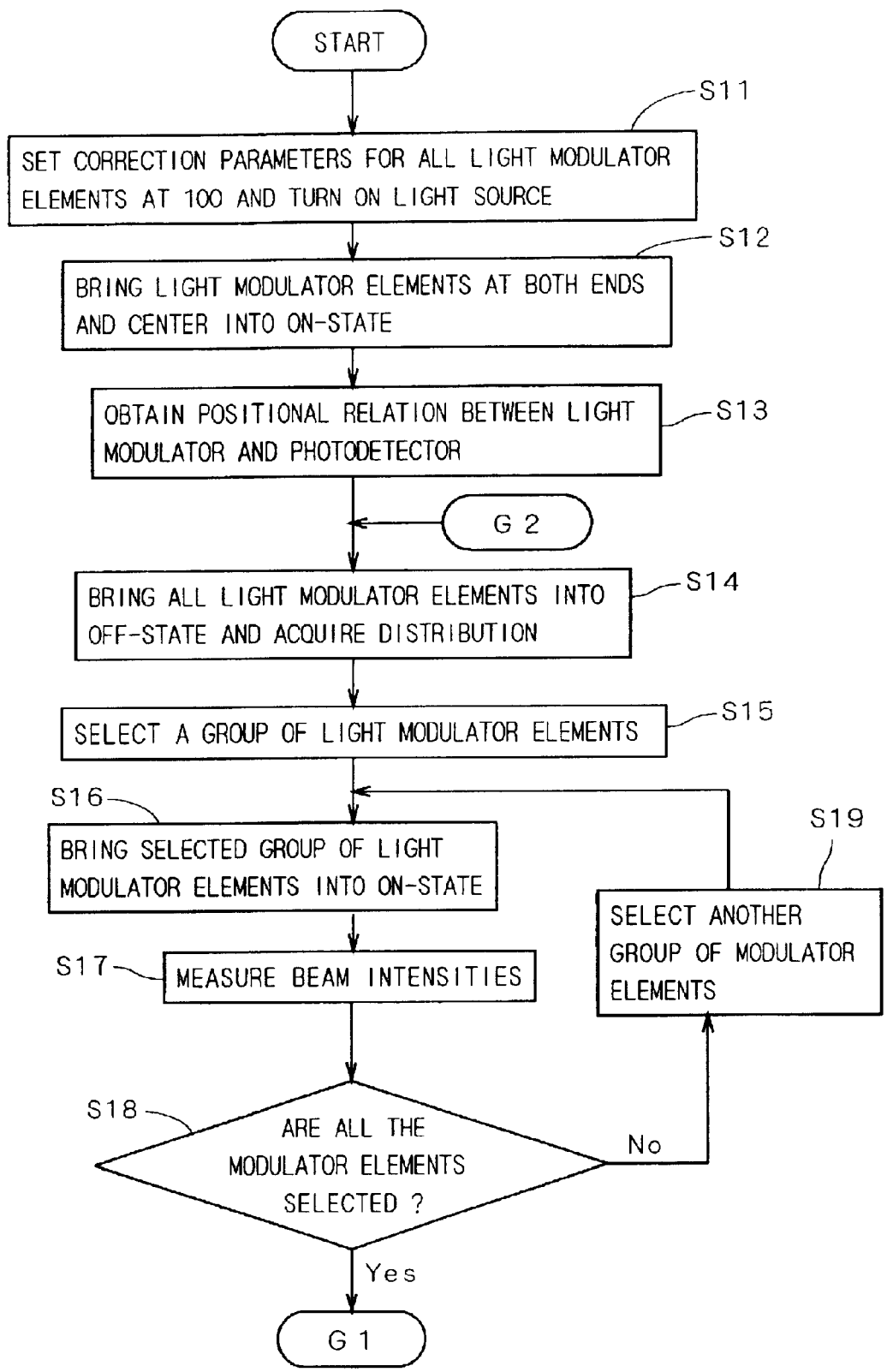
FIGS. 6 and 7 are flow charts showing an operation of the image recording apparatus in light intensity correction.
Figure 7:
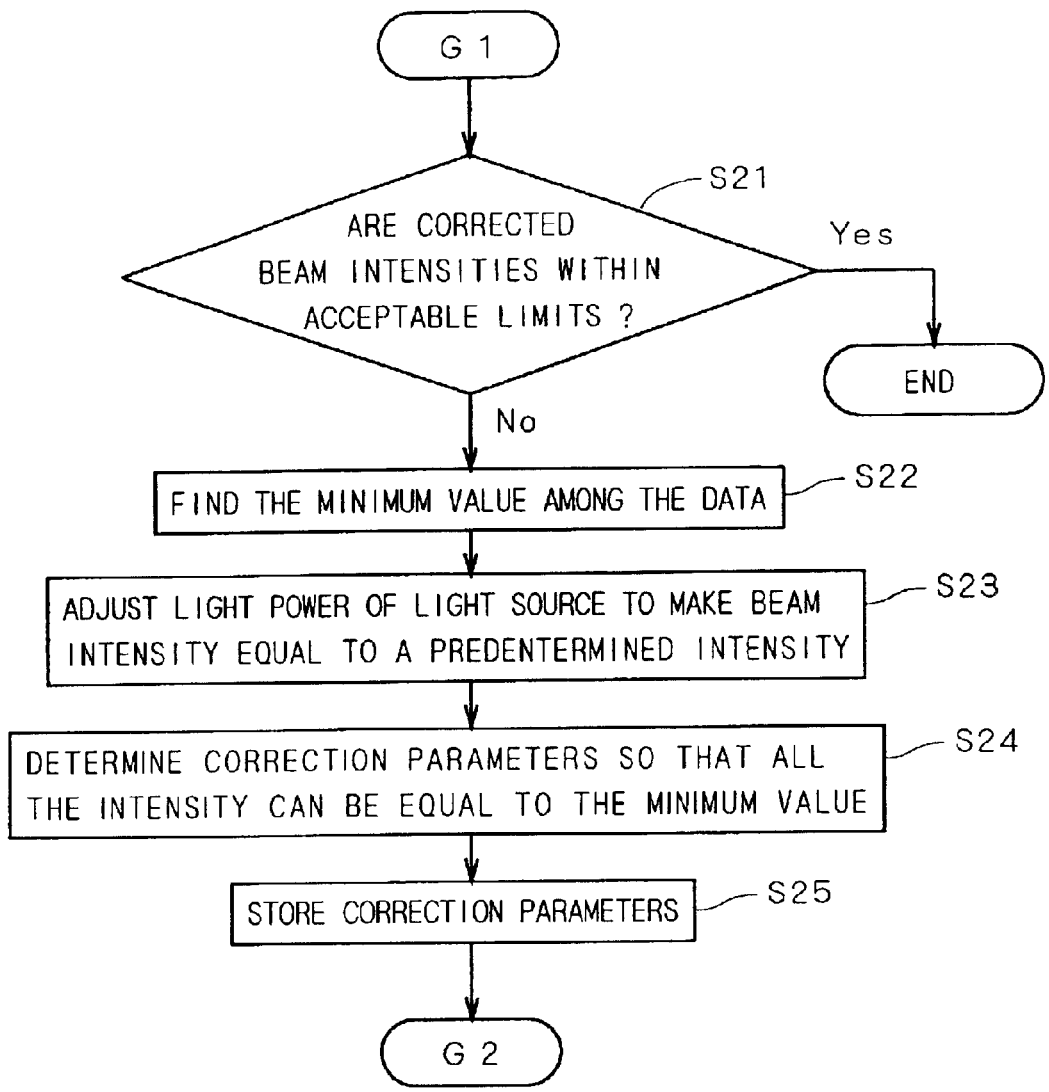

FIGS. 6 and 7 are flowcharts showing a procedure in calibrating the beam intensity in the recording apparatus 1.

At the first step S11, the parameters for the modulator elements are all set to 100 and the light source 11 is turned on. Following that, three modulator elements at center and both ends are brought to "On-state" so as to bring the modulator elements into correspondence with the photodetector elements(S12 and S13). The term "On-state" means the state where the modulator element is operated to render a signal light beam with the intensity according to the parameter. After the initialization, the photodetector 2 measures the "Off-state" intensity distribution with all the modulator elements are operated not to render a signal light beam (S14).

Prior to the "On-state" intensity distribution, a group of modulator elements which are spatially separate from one another is selected (S15). Then all the selected elements are brought to "On-state" and the beam intensities are measured by the photodetector 2 (S16 and S17).

Figure 8:
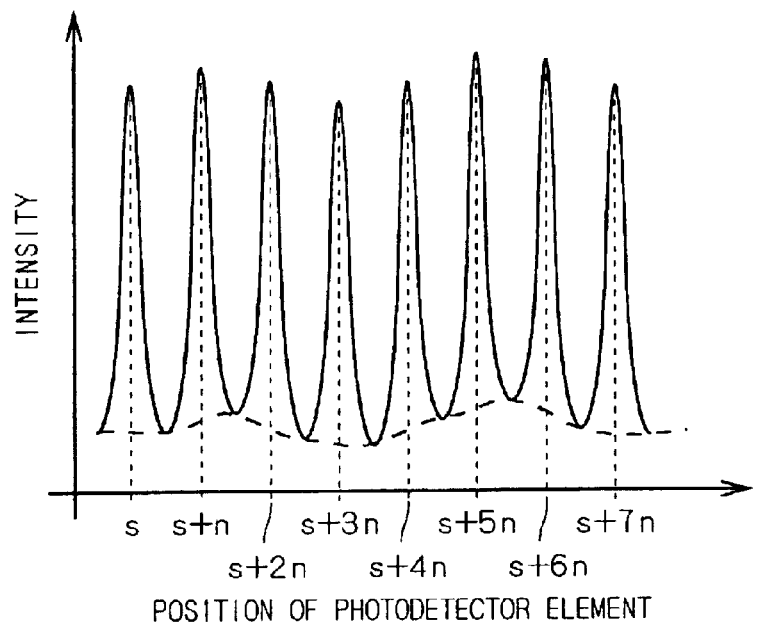
FIG. 8 is a view showing an example of measurement data on a group of separate elements.

FIG. 8 shows an example of an intensity profile with a group of selected elements in "On-state." Each element is selected to be separate from the adjacent one by a distance of n(integer) elements. The dashed line describes the "Off-state" distribution.

Figure 9:
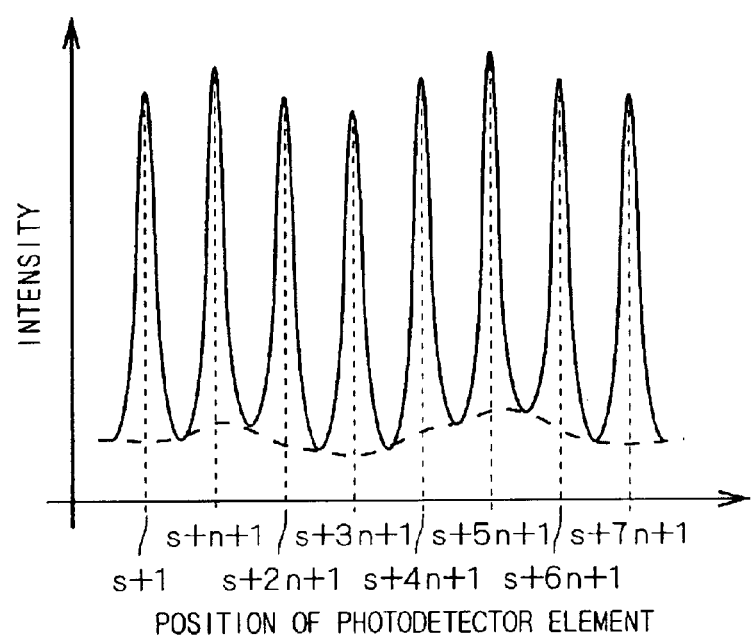
FIG. 9 is a view showing measurement data on another group of separate elements.

After one measurement is done, another group of modulator elements are selected. FIG. 9 shows an example of an intensity profile with a group of the elements next to the previous ones in "On-state." Such measurements are repeated until all the modulator elements are selected. The intensity data are stored in the memory 401.

In this way, the beam intensity of each modulator element is obtained with no effect of light from the neighboring elements.

Figure 10:
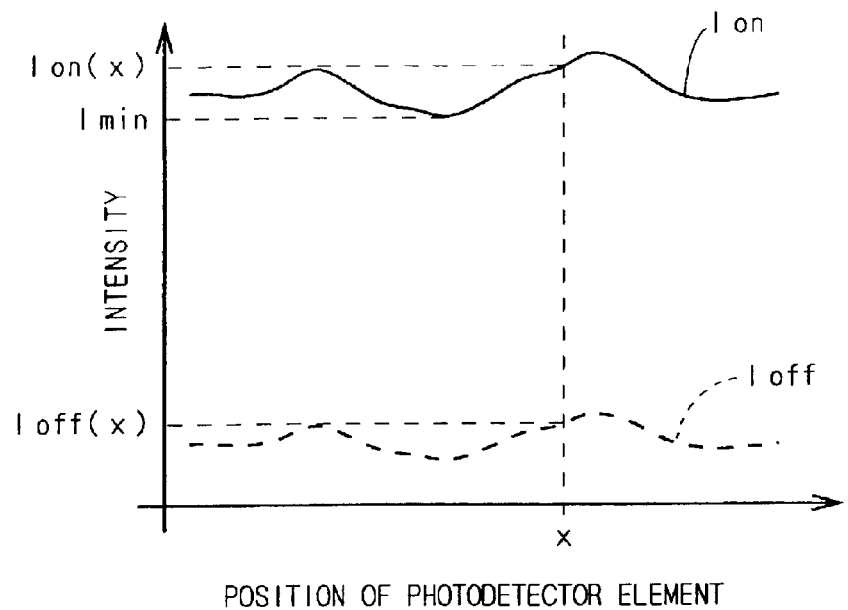
FIG. 10 is a graph showing an intensity profile obtained after repeated measurements.

FIG. 10 shows "On-state" and "Off-state" intensity profiles obtained after the repeated measurements. The poor uniformity of the profiles is mainly due to the non-uniform illumination on the light modulator 12.

Figure 11:
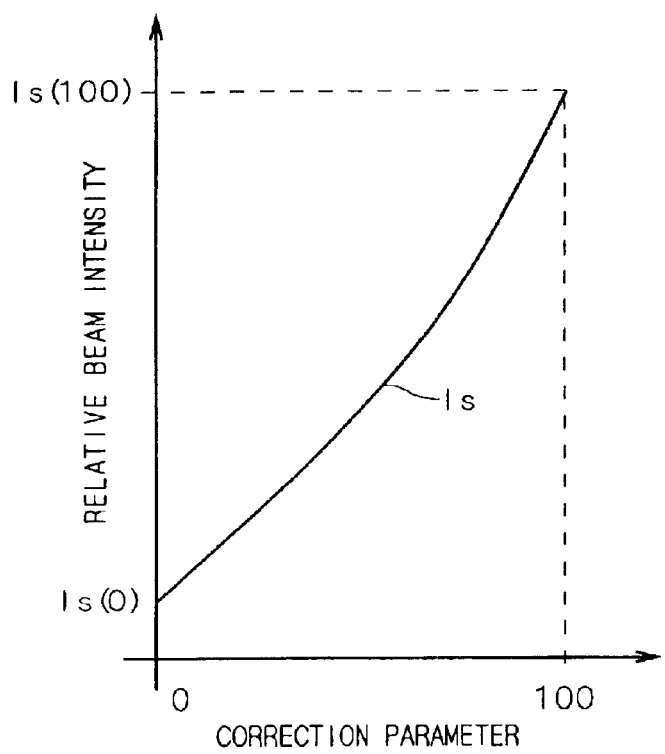
FIG. 11 is a view showing a relation between the correction parameter and the beam intensity.

The correction parameter calculation means 34 finds out a correction parameter for each modulator element which makes the beam intensity the lowest value among the data(indicated as Imin in FIG. 10.) A typical relationship between the correction parameter and the beam intensity is shown in FIG. 11. The best correction parameter, P, is calculated from the following equation:

$$\frac{Is(P) - Is(0)}{Is(100) - Is(0)} = \frac{Imin - Ioff(x)}{Ion(x) - Ioff(x)} \quad (1)$$

After such calculations, all the best parameters are stored in memory 421.

If any of the beam intensities corresponding to the modulator elements 121 is within acceptable limits, then the beam intensity calibration comes to an end (S21). Otherwise, the light power of the laser source 11 is adjusted to make the minimum intensity equal to a predetermined target intensity (S23) and the correction data are recalculated (S14 and S15).

After the method mentioned above, it is possible to find out the best correction parameter for each modulation element, even if the extinction rate is not so high. Furthermore, it takes very short time to finish the calibration because of the simultaneous measurement on a group of modulator elements.

<3. Another Constitution of Apparatus>

Several optical elements can be either added to or used in lieu of the optics 13 to facilitate the calibration.

Figure 12:
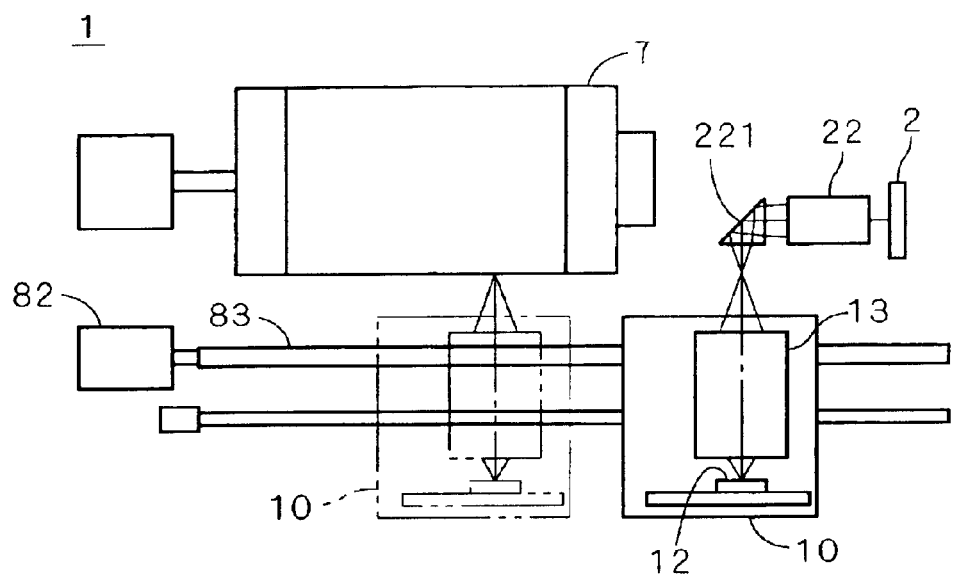
FIG. 12 is a view showing another exemplary constitution of the image recording apparatus.

The recording apparatus shown FIG. 12 includes a prism 221 and a relay optics 22. This constitution can be applied if the space facing the optics 13 is not big enough to dispose the photodetector 2. The relay optics 22 can have the function of (de)magnifying the image on the photodetector 2.

Figure 13:
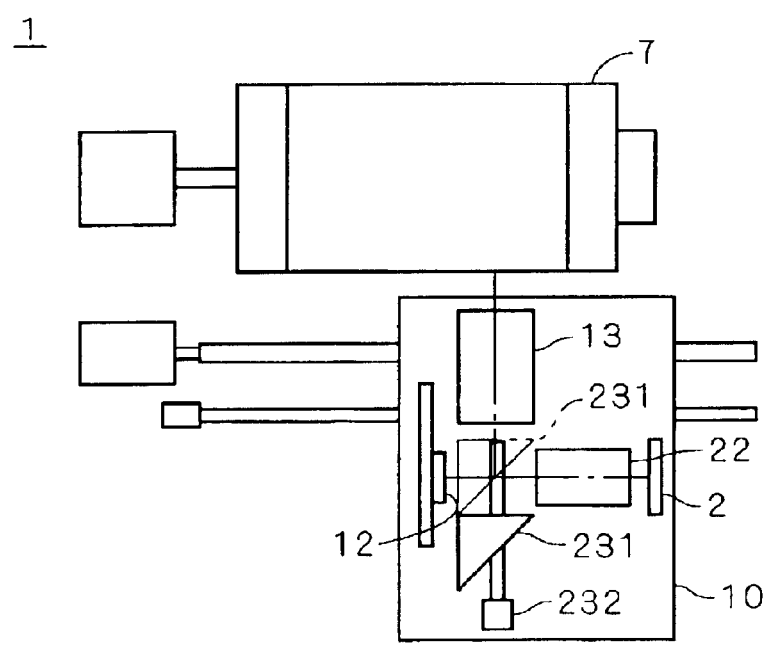
FIG. 13 is a view showing still another exemplary constitution of the image recording apparatus.
Figure 14:
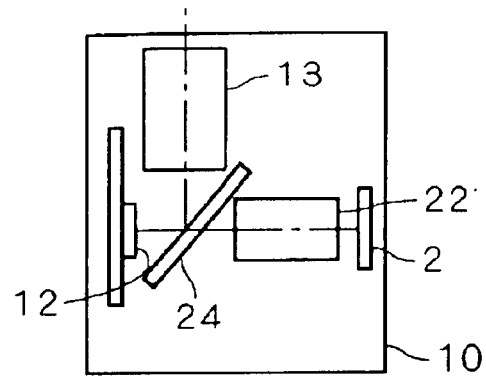
FIG. 14 is a view showing another exemplary constitution of the optical head.
Figure 15:
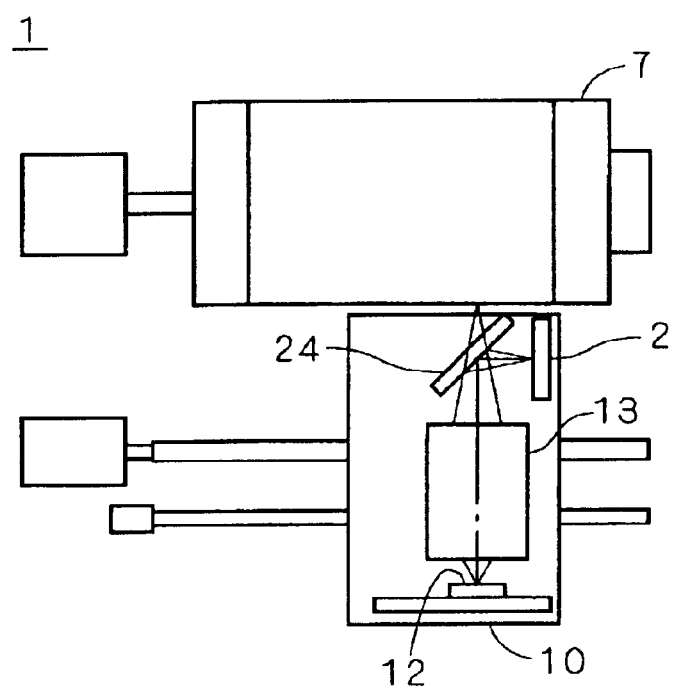
FIG. 15 is a view showing further exemplary constitution of the image recording apparatus.

Any of the embodiments shown in FIGS. 13, 14, and 15 has a optical head 10 which contains a photodetector 2. The optical head 10 shown in FIG. 13 further contains a turning mirror (prism) actuated by a motor 232 for switching between the recording path and the calibration path. FIG. 14 shows a optical head which has a relay optics 22 and a beam splitter 24 disposed between the light modulator 12 and the optics 13 for bringing means of the light beams to the relay optics 22. The optical head 10 shown in FIG. 15 contains a beam splitter 24 disposed between the optics 13 and the holding drum 7. Any of the opticalf heads in FIGS. 13, 14, and 15 does not need moving to a predetermined calibration position.

<4. Variations>

Though the preferred embodiments of the present invention have been discussed above, the present invention is not limited to the above-discussed preferred embodiments, but allows various variations.

The light source 11 of the above preferred embodiments is not limited to a semiconductor laser bar, but may be a semiconductor laser having a single emitter or a two-dimensionally arranged semiconductor laser array. Light sources other than the semiconductor laser may be also used.

The light modulator 12 may have a constitution in which a plurality of two-dimensionally arranged light modulator elements 121. In this case, it is preferable that the photodetector elements 21 of the photodetector 2 should be also two-dimensionally arranged.

The light modulator element 121 is not limited to the Grating Light Valve™, but may be an electro-optic shutter array such a PLZT (lead lanthanum zirconium titanate) modulator and a TIR (total internal reflection) type of device. The technique of using a plurality of photodetector elements allows a proper light intensity correction in a case where various light modulator elements which do not have high contrast of intensity between a light from a light modulator element in "ON state" and that from a light modulator element in "OFF state" are used.

Though the recording medium 9 is held by the holding drum 7 and the main scanning is performed by rotation of the holding drum 7 and the sub-scanning is performed by movement of the optical head 10 in the image recording apparatus 1, there may be a case where the recording medium 9 is held on a plane base and the main and sub-scanning are both performed by relative movement between the optical head 10 and the recording medium 9.

Thus, the light beams from a plurality of light modulator elements 121 of the light modulator 12 which are subject to calibration are received by a plurality of photodetector elements 21 and if the photodetector elements outnumbers the light modulator elements 121 which are subject to calibration, the calibration can be achieved with higher accuracy.

While the invention has been shown and described in detail, the foregoing description is in all aspects illustrative and not restrictive. It is therefore understood that numerous modifications and variations can be devised without departing from the scope of the invention.

What is claimed is:

1. An image recording apparatus for recording an image on a recording medium, comprising:
    a light source;
    a light modulator having a plurality of light modulator elements for receiving light from said light source;
    a holding means for holding said recording medium which is exposed to signal light beams from said light modulator;
    a photodetector having a plurality of photodetector elements;
    a recording optics for bringing said signal light beams to said recording medium;
    a detection optics for bringing the signal beams from said light modulator to said photodetector at a time, the signal beams being subject to beam intensity correction;
    correction electronics for providing correction data to said light modulator; and
    a controller for selecting a group of said plurality of light modulator elements, each element of which is selected to be spatially separate from an adjacent one by a distance of n (integer) elements, and sequentially reselecting one group after another until all of said plurality of light modulator elements are selected, wherein
    each of said plurality of light modulator elements comprises a plurality of ribbon-like diffraction grating members for generating diffracted light beams and a normally reflected light beam.

2. The image recording apparatus according to claim 1, further comprising:
    a different optical path for beam intensity detection from that for recording an image.

3. The image recording apparatus according to claim 2, wherein
    a switching mechanism for switching between said optical path for beam intensity detection and said optical path for recording an image.

4. The image recording apparatus according to claim 1, wherein
    said detection optics comprises a beam splitter for sampling each signal beam.

5. The image recording apparatus according to claim 1, wherein
    said plurality of photodetector elements outnumber said plurality of light modulator elements.

6. The image recording apparatus according to claim 1, wherein
    the light power of said light source is adjusted to make the corrected beam intensity equal to a predetermined target intensity.

7. A method of correcting intensities of signal beams from a plurality of light modulator elements in an image recording apparatus, each of said plurality of light modulator elements comprising a plurality of ribbon-like diffraction grating members for generating diffracted light beams and a normally reflected light beam, said method comprising:
    a selection step of selecting a group of modulator elements, each element of which is selected to be spatially separate from an adjacent one by a distance of n (integer) elements;
    a measurement step of measuring the beam intensities of said group of modulator elements at a time with a photodetector having a plurality of photodetector elements;
    a reselection step of selecting another group of modulator elements for measuring the beam intensities of said another group until all of said modulator elements are selected; and a calculation step of calculating correction data for all of said modulator elements.

8. The method of correcting intensities of signal beams from a plurality of light modulator elements in an image recording apparatus according to claim 7, wherein said correction data are determined so that all of said beam intensities can be equal to the minimum value among the measurement data acquired after the repeated intensity measurements.

9. The method of correcting intensities of signal beams from a plurality of light modulator elements in an image recording apparatus according to claim 7, further comprising:

a light power adjustment step of adjusting the light power of said light source to make the beam intensity equal to a predetermined intensity.

10. An image recording apparatus for recording an image on a recording medium, comprising:

a light source;

a light modulator having a plurality of light modulator elements receiving light from said light source;

a holding means for holding said recording medium which is exposed to signal light beams from said light modulator;

a photodetector having a plurality of photodetector elements;

a recording optics for bringing said signal light beams to said recording medium;

a detection optics for bringing the signal beams from said light modulator to said photodetector at a time, the signal beams being subject to beam intensity correction;

correction electronics for providing correction data to said light modulator; and a controller for selecting a group of said plurality of light modulator elements which are spatially separate from one another to obtain the beam intensity of each element of said group with no effect of light from neighboring elements, and sequentially reselecting one group after another until all of said plurality of light modulator elements are selected, wherein each of said plurality of light modulator elements comprises a plurality of ribbon-like diffraction grating members for generating diffraction light beams and a normally reflected light beam.

11. The image recording apparatus according to claim 10, further comprising:

a different optical path for beam intensity detection from that for recording an image.

12. The image recording apparatus according to claim 11, wherein a switching mechanism for switching between said optical path for beam intensity detection and said optical path for recording an image.

13. The image recording apparatus according to claim 10, wherein said detection optics comprises a beam splitter for sampling each signal beam.

14. The image recording apparatus according to claim 10, wherein said plurality of photodetector elements outnumber said plurality of light modulator elements.

15. The image recording apparatus according to claim 10, wherein the light power of said light source is adjusted to make the corrected beam intensity equal to a predetermined target intensity.

* * * * *